United States Patent
Kobayashi et al.

(10) Patent No.: US 7,567,514 B2
(45) Date of Patent: Jul. 28, 2009

(54) RAID APPARATUS, AND COMMUNICATION-CONNECTION MONITORING METHOD AND PROGRAM

(75) Inventors: Akihito Kobayashi, Kawasaki (JP);
Hidenori Yamada, Kawasaki (JP);
Katsuhiko Nagashima, Kawasaki (JP);
Hideaki Omura, Kawasaki (JP); Koji Uchida, Kawasaki (JP); Shinichi Nishizono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 702 days.

(21) Appl. No.: 11/229,693

(22) Filed: Sep. 20, 2005

(65) Prior Publication Data
US 2007/0005885 A1    Jan. 4, 2007

(30) Foreign Application Priority Data
Jun. 30, 2005    (JP)    ............... 2005-191512

(51) Int. Cl.
*H04L 12/26*    (2006.01)
(52) U.S. Cl. ............... 370/236; 710/58; 710/17; 710/18
(58) Field of Classification Search ............... 370/236; 709/224; 711/114; 710/15, 74
See application file for complete search history.

(56) References Cited
U.S. PATENT DOCUMENTS

| | | | | |
|---|---|---|---|---|
| 6,078,956 A | * | 6/2000 | Bryant et al. | ............... 709/224 |
| 6,411,998 B1 | * | 6/2002 | Bryant et al. | ............... 709/224 |
| 6,915,380 B2 | * | 7/2005 | Tanaka et al. | ............... 711/114 |
| 7,251,701 B2 | * | 7/2007 | Chikusa et al. | ............... 710/74 |
| 7,383,380 B2 | * | 6/2008 | Yagisawa et al. | ............... 710/15 |
| 2006/0190682 A1 | * | 8/2006 | Noguchi et al. | ............... 711/114 |

FOREIGN PATENT DOCUMENTS

| | | |
|---|---|---|
| JP | 06-121002 | 4/1994 |
| JP | 7-6058 | 1/1995 |
| JP | 2001-43030 | 2/2001 |
| JP | 2003-233514 | 8/2003 |

OTHER PUBLICATIONS

Office Action issued Jan. 20, 2009 in co-pending Japanese application No. 2005-191512.

* cited by examiner

*Primary Examiner*—Chi H Pham
*Assistant Examiner*—Albert T Chou
(74) *Attorney, Agent, or Firm*—Staas & Halsey LLP

(57) ABSTRACT

An interdevice communication monitoring unit 62-1 calculates a variable timeout time (T2−T) by subtracting an elapsed time T from a predetermined fixed timeout time T2 for monitoring an intermodule communication to monitor an elapsed time of an intermodule communication. The fixed timeout time T2 is a time shorter than a predetermined interface connection check time T1 for monitoring an interface connection with a channel. When the elapsed time T of the intermodule communication exceeds the variable timeout time (T2−T), the interdevice communication monitoring unit requests a channel to separate the interface connection, and then when an end response is obtained from a control module, requests the channel for an interface reconnection and then transmits an end response.

13 Claims, 14 Drawing Sheets

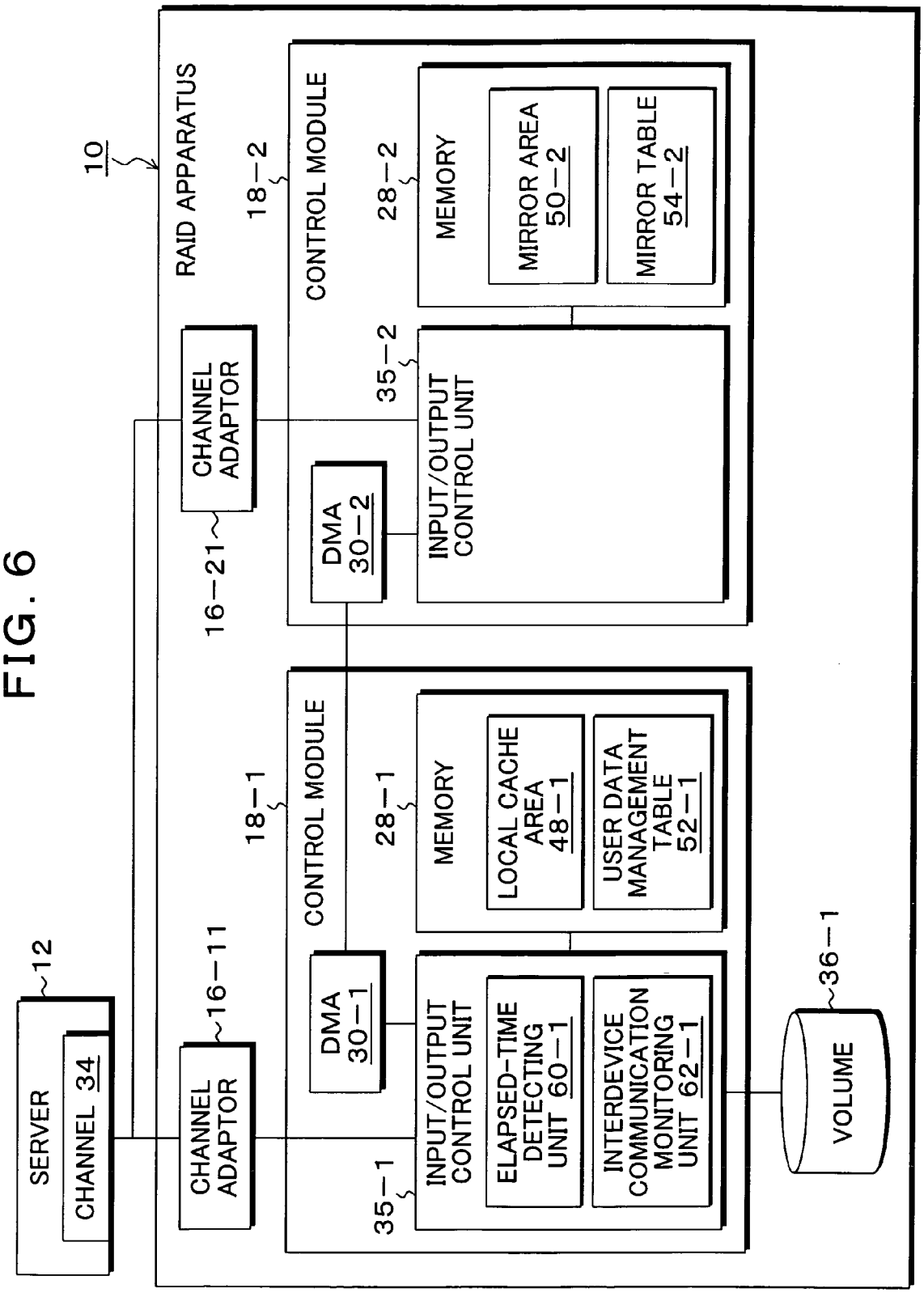

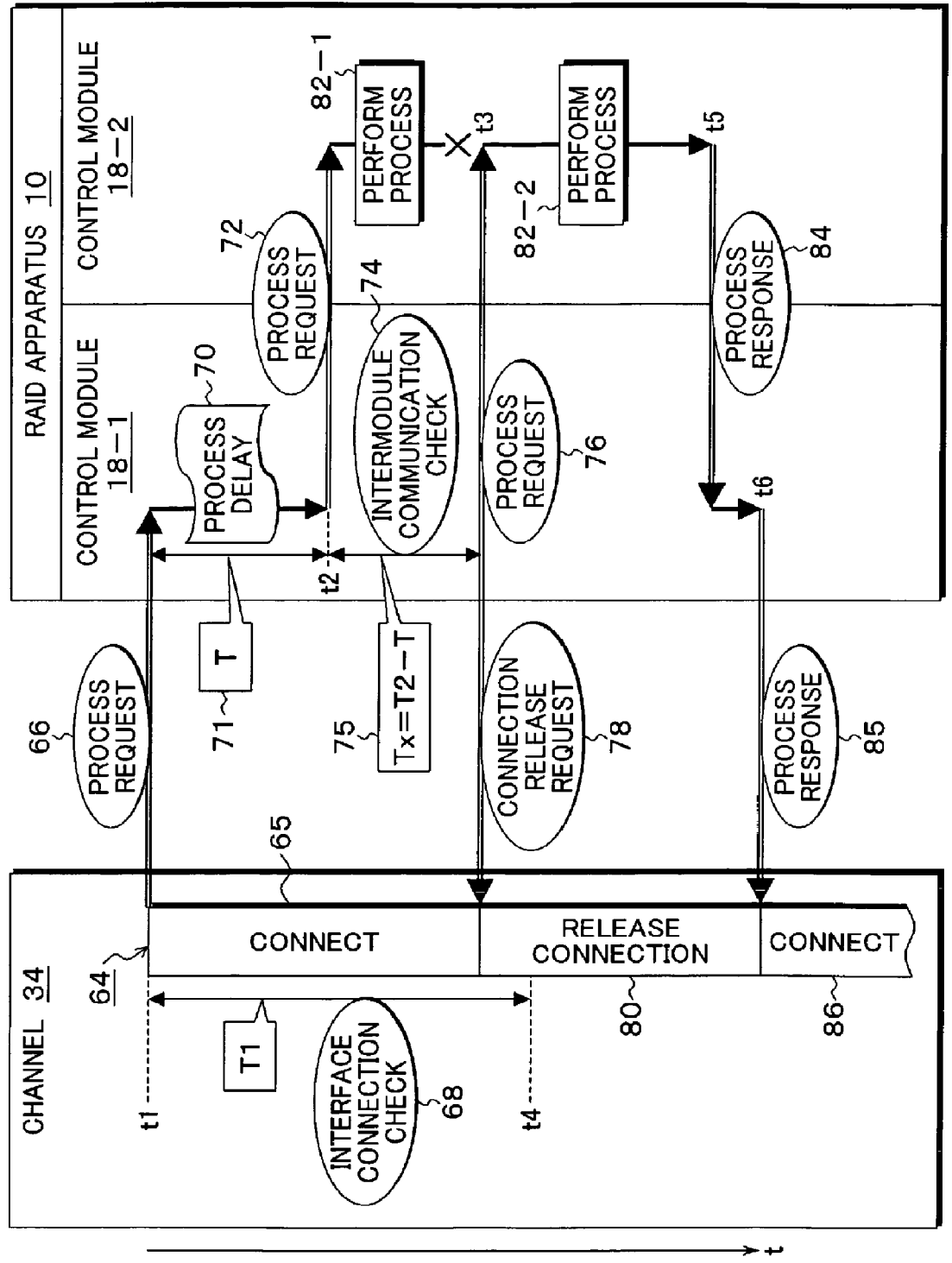

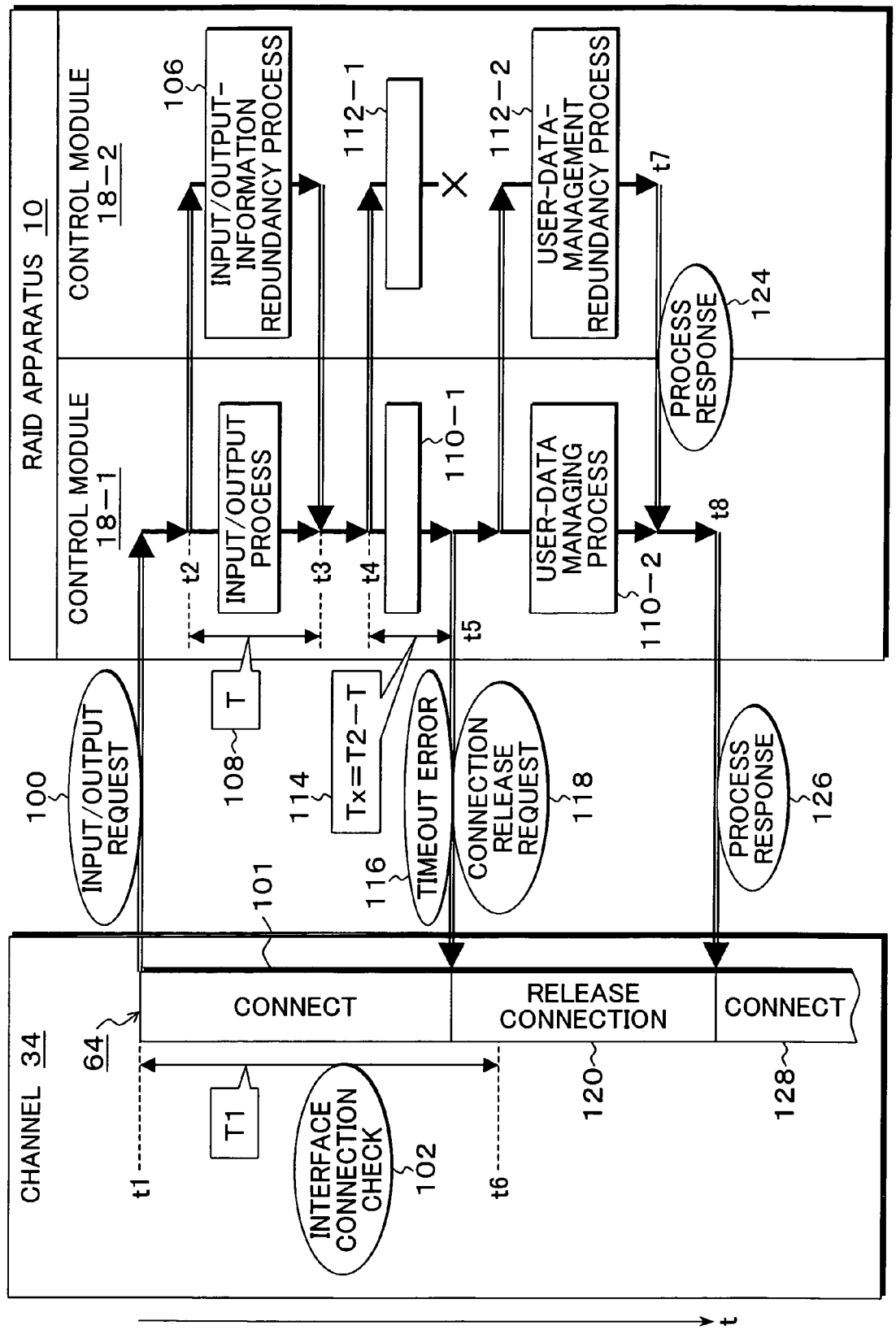

RAID APPARATUS, AND COMMUNICATION-CONNECTION MONITORING METHOD AND PROGRAM

This application is a priority based on prior application No. JP 2005-191512, filed Jun. 30, 2005, in Japan.

BACKGROUND OF THE INVENTION

1. Field of the Invention

The present invention relates to a RAID apparatus, and communication-connection monitoring method and program in which a communication timeout time is monitored when a plurality of processing devices hierarchically perform processes upon a process request from a host device and make a response and, particularly, to a RAID apparatus, and communication-connection monitoring method and program allowing a response so as not to cause an overrun of a timeout time of a channel connection of the host device even if a hierarchical process takes time.

2. Description of the Related Arts

Conventionally, a RAID apparatus for use as a storage device for a global server, an open server, or the like is formed of a plurality of control modules, channel adaptors, device adaptors, disk enclosures, and routers. The control modules each include a CPU, a cache, or the like to control the operation of the entire storage device. The channel adaptors are modules that connect the RAID apparatus and various servers, and use an interface, such as Fibre Channel or iSCSI. The device adaptors are modules that connect the control modules and drive enclosures having incorporated therein a plurality of magnetic disk drives together, and use the Fibre Channel interface. Furthermore, the routers are modules for high-speed connection among the control modules, the channel adaptors, and the device adaptors. In such a conventional RAID apparatus, a command of an input/output request issued through an interface connection by a channel of a server, which is a host device, is received, and then an input/output process is performed on a volume via a cache. Normally, a communication time of the interface connection between the channel and the RAID apparatus is monitored through an interface connection check ICC. If a predetermined time has elapsed with the channel and the RAID apparatus being in a connection state, an ICC timeout error is determined to forcefully separate, at the channel side, the connection with the RAID apparatus, determine abnormality of the RAID apparatus, and suppress subsequent input/output requests. A factor responsible for the occurrence of a timeout error in the interface connection check ICC at the channel side is intermodule communication (interdevice communication) when two control modules provided in the RAID apparatus hierarchically perform processes upon a process request from the channel, such communication taking time for process. Therefore, in the conventional RAID apparatus, as a timeout time for monitoring an interdevice communication for a hierarchical process by two control modules, a time shorter than the timeout time of the interface connection check ICC at the channel side is set to a timer value. When the hierarchical process by two control modules takes time, a timeout error of the interdevice communication in the two control modules is caused before a timeout error of the communication connection with the channel. Then, separation of the interface connection from the RAID apparatus side is requested of the channel, and then the interface connection is released before an error of the interface connection check ICC is determined.

FIG. 1 is a drawing for describing a communication-connection monitoring process in the conventional RAID apparatus. In FIG. 1, a channel 200 establishes at a time t1 an interface connection with a control module 204 provided in a RAID apparatus 202 for transmission of a process request 208. The control module 204 reads the process request 208, establishes an interdevice communication with the control module 206, and then transmits a process request 210 at a time t2. The control module 206 performs a process execution 215 corresponding to the process request 210, and returns at a time t4 a process response 212 indicative of a normal end. Upon reception of this, the control module 204 transfers at a time t6 a process response 214 to the channel 200. The channel 200 then releases the connection with the RAID apparatus 202. Here, the channel 200 sets at the time t1 a timeout time T1 of an interface connection check (ICC) 216 to a timer value to monitor whether a response from the RAID apparatus 202 comes within the timeout time T1. Also, in the control module 204, when the interdevice communication is started at the time t2, as an intermodule communication check 218, at timeout time T2 of the interdevice communication shorter than the timeout time T1 at the channel side is set to a timer value to monitor whether the process response 212 is obtained from the control module 206. In the case of FIG. 1, the hierarchical process by the control modules 204 and 206 has no delay, and neither an error resulting from a lapse of the timeout time T2 of the interdevice communication nor an error resulting from a lapse of timeout time T1 of the interface connection check ICC at the channel 200 side occurs, and the process is caused to normally end.

FIG. 2 depicts the case where the hierarchical process by the control module 206 takes time. In this case, an interdevice communication is established at the time t2 to start a process execution 215-1 of the control module 206, but this process takes time to cause an overrun of the timeout time T2 of the intermodule communication check 218 at a time t3, which is a time before a process response is to be issued at the time t4, thereby causing the occurrence of a timeout error. With a connection release request 220 being issued to the channel 200, the interface connection between the channel 200 and the RAID apparatus 202 is released, thereby preventing the occurrence of a timeout error due to an overrun of the timeout time T1 of the interface connection check 216. Furthermore, if a timeout error of the intermodule communication is determined at the time t3 to release the connection with the channel 200, the possibility of the occurrence of an error in the process execution 215-1 of the control module 206 is high. Therefore, the process request 210 issued at the time t2 is cancelled, and again a process request 222 having the same content is issued to the control module 206 with an interdevice communication being established, thereby performing a same process execution 215-2 and waiting for a process response from the control module 206. When a process response 212 is obtained at a time t5, the control module 204 requests at a time t6 an interface reconnection of the channel 200. Upon establishment of the connection, a process response 214 is transferred, thereby ending the series of processes. Here, even if a process response to the process request 210 is obtained from the control module 206 after the timeout error, the process request 210 issued at the time t2 is cancelled at the time of the timeout error, and therefore that process response is discarded.

[Patent Document 1] Japanese Patent Laid-Open Publication No. 2003-233514

[Patent Document 2] Japanese Patent Laid-Open Publication No. 07-006058

However, in such conventional monitoring of the interdevice communication with the timeout time T2 shorter than the timeout time T1 of the interface connection check at the channel side being set, if a process until the start of the interdevice communication takes time, a problem arises such that a timeout error of the interface connection check at the channel side will occur.

FIG. 3 depicts the case where the process until the start of the interdevice communication is delayed. In FIG. 3, the control module 204 receiving the process request 208 from the channel 200 at a time t1 has a process delay 224 due to some cause, and then at a time t2 after an elapsed time T, issues a process request 210 to the control module 206. Therefore, the timeout time T1 of the channel 200 expires at a time t3 before a time t4 when the timeout time T2 of the interdevice communication expires in the control module 204. Thus, a problem arises such that a timeout error 224 of the interface connection check 216 occurs, thereby separating the interface connection with the RAID apparatus 202, error-ending the process at the channel 200 side, and not allowing subsequent requests from or response to the RAID apparatus 202.

SUMMARY OF THE INVENTION

According to the present invention to provide a RAID apparatus, and communication-connection monitoring method and program preventing the occurrence of a timeout error of interface connection monitoring at a channel side even if a process accompanying an interdevice communication takes time.

The present invention is directed to a RAID apparatus including a first processing device (control module) and a second processing device (control module) that perform a volume input/output process, wherein a process request received by the first processing device through an interface connection with a host device (server) is transmitted to the second processing device through an interdevice communication for a hierarchical process and an end response is transferred from the second processing device via the first processing device to the host device for releasing the interface connection.

Such a RAID apparatus of the present invention includes an elapsed-time detecting unit 60-1 that detects an elapsed time from a time when the first processing device receives the process request from the host device until transmitting the process request to the second processing device through the interdevice communication, and an interdevice communication monitoring unit 62-1 that calculates a variable timeout time Tx (=T2−T) by subtracting the elapsed time T from a predetermined fixed timeout time T2 for monitoring the interdevice communication between the first processing device and the second processing device, and monitors an elapsed time of the interdevice communication.

Here, the fixed timeout time T2 is a time shorter than a predetermined interface connection check time T1 for monitoring an elapsed time of the interface connection between the host device and the first processing device.

When the elapsed time of the interdevice communication exceeds the variable timeout time, the interdevice communication monitoring unit requests the host device to separate the interface connection, and then when the end response is obtained from the second processing device, requests the host device for an interface reconnection and transmits the end response.

The elapsed-time detecting unit detects an elapsed time from a time when the first processing device receives the process request from the host device until transmitting a first process request (first transaction request) to the second processing device through the interdevice communication to obtain an end response, and the interdevice communication monitoring unit calculates a variable timeout time by subtracting the elapsed time from the fixed timeout time, and monitors an elapsed time until a second process request (second transaction request) is transmitted to the second processing device through an interdevice communication to obtain an end response.

The process request to be transmitted by the first processing device to the second processing device through the interdevice communication is, for example, a process request for making process information associated with the input/output request redundant.

The present invention is directed to a communication-connection monitoring method of a RAID apparatus including a first processing device and a second processing device that perform a volume input/output process, wherein a process request received by the first processing device through an interface connection with a host device is transmitted to the second processing device through an interdevice communication for a hierarchical process and an end response is transferred from the second processing device via the first processing device to the host device for releasing the interface connection.

The communication-connection monitoring method of the above-described RAID apparatus according to the present invention includes:

an elapsed-time detecting step of detecting an elapsed time T from a time when the first processing device receives the process request from the host device until transmitting the process request to the second processing device through the interdevice communication; and an interdevice communication monitoring step of calculating a variable timeout time Tx by subtracting the elapsed time T from a predetermined fixed timeout time T2 for monitoring the interdevice communication between the first processing device and the second processing device, and monitoring an elapsed time of the interdevice communication.

The present invention is directed to a program to be executed by a computer of a first processing device provided in the RAID apparatus including the first processing device and a second processing device that perform a volume input/output process, wherein a process request received by the first processing device through an interface connection with a host device is transmitted to the second processing device through an interdevice communication for a hierarchical process and an end response is transferred from the second processing device via the first processing device to the host device for releasing the interface connection.

The program according to the present invention causes the computer of the first processing device provided in the RAID apparatus to execute steps including: an elapsed-time detecting step of detecting an elapsed time T from a time when receiving the process request from the host device until transmitting the process request to the second processing device through the interdevice communication, and an interdevice communication monitoring step of calculating a variable timeout time Tx by subtracting the elapsed time T from a predetermined fixed timeout time T2 for monitoring the interdevice communication between the first processing device and the second processing device, and monitoring an elapsed time of the interdevice communication.

Here, details of the communication-connection monitoring method and program are basically identical to those of the communication-connection monitoring apparatus according to the present invention.

According to the present invention, even if a process before the start of the interdevice communication between the first processing device and the second processing device takes time, an elapsed time T before the start of the interdevice communication is detected, and this elapsed time T is subtracted from a predetermined fixed timeout time T2 for monitoring the interdevice communication to find a variable timeout time Tx. Since the interdevice communication is monitored with the variable timeout time Tx, before a timeout time T1 for monitoring the interface connection at the host device side expires, a timeout error of the interdevice communication is caused at the RAID apparatus side, thereby separating the connection with the host device side. This can reliably prevent the occurrence of a timeout error of the interface connection monitoring at the host side. Furthermore, in the communication-connection monitoring according to the present invention, also when two processing devices provided in the RAID apparatus use the interdevice communication to successively perform different hierarchical processes, for example, redundancy processes, twice for a process request from the host device, an elapsed time T of a hierarchical process associated with an interdevice communication for the first time is detected, and as a timeout time of another hierarchical process associated with an interdevice communication for the second time, a variable timeout time Tx obtained by subtracting the elapsed time T for the first time from a fixed timeout time T2 for monitoring the interdevice communication is found for monitoring the interdevice communication. Therefore, similarly, even if the hierarchical process for the first time takes time, before the timeout time T1 of the interface connection monitoring at the host device side expires, a timeout error of the interdevice communication is caused at the RAID apparatus side to separate the interface connection with the host device, thereby reliably preventing the occurrence of a timeout error of the interface connection check (ICC) at the host side device. The above and other objects, features, and advantages of the present invention will become more apparent from the following detailed description with reference to the drawings.

BRIEF DESCRIPTION OF THE DRAWINGS

FIG. 6 is a block diagram of a functional structure of the present invention when a process request requiring an intermodule communication is executed;

FIG. 7 is a drawing for describing a process of monitoring an intermodule communication connection according to the present invention;

FIG. 10 is a drawing for describing a communication-connection monitoring process according to the present invention when a redundancy process is performed through an intermodule communication;

DETAILED DESCRIPTION OF THE PREFERRED EMBODIMENTS

Figure 1:
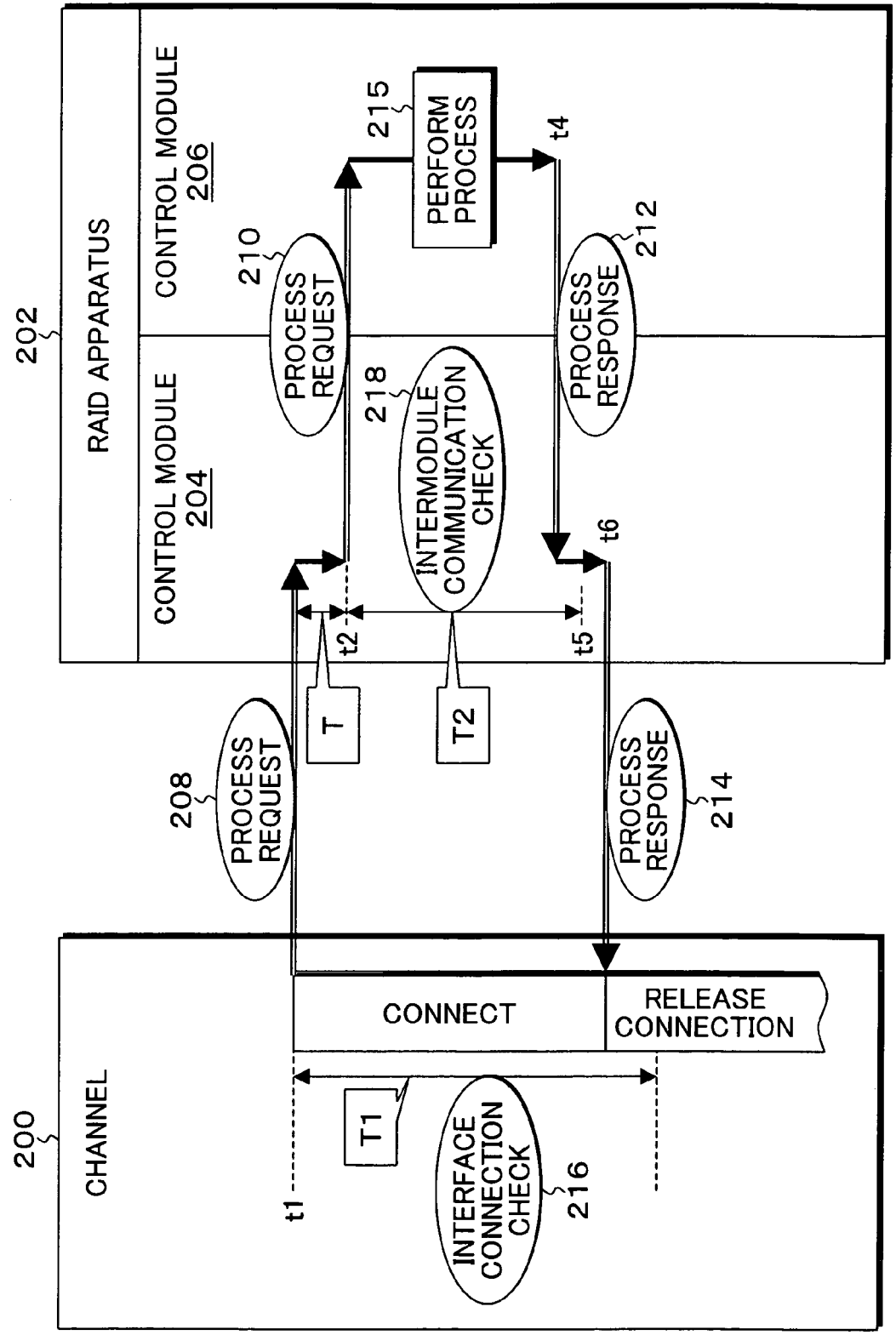
FIG. 1 is a drawing for describing a conventional cooperative process of interface connection check at the channel side and intermodule-communication-connection monitoring at the RAID apparatus side.
Figure 2:
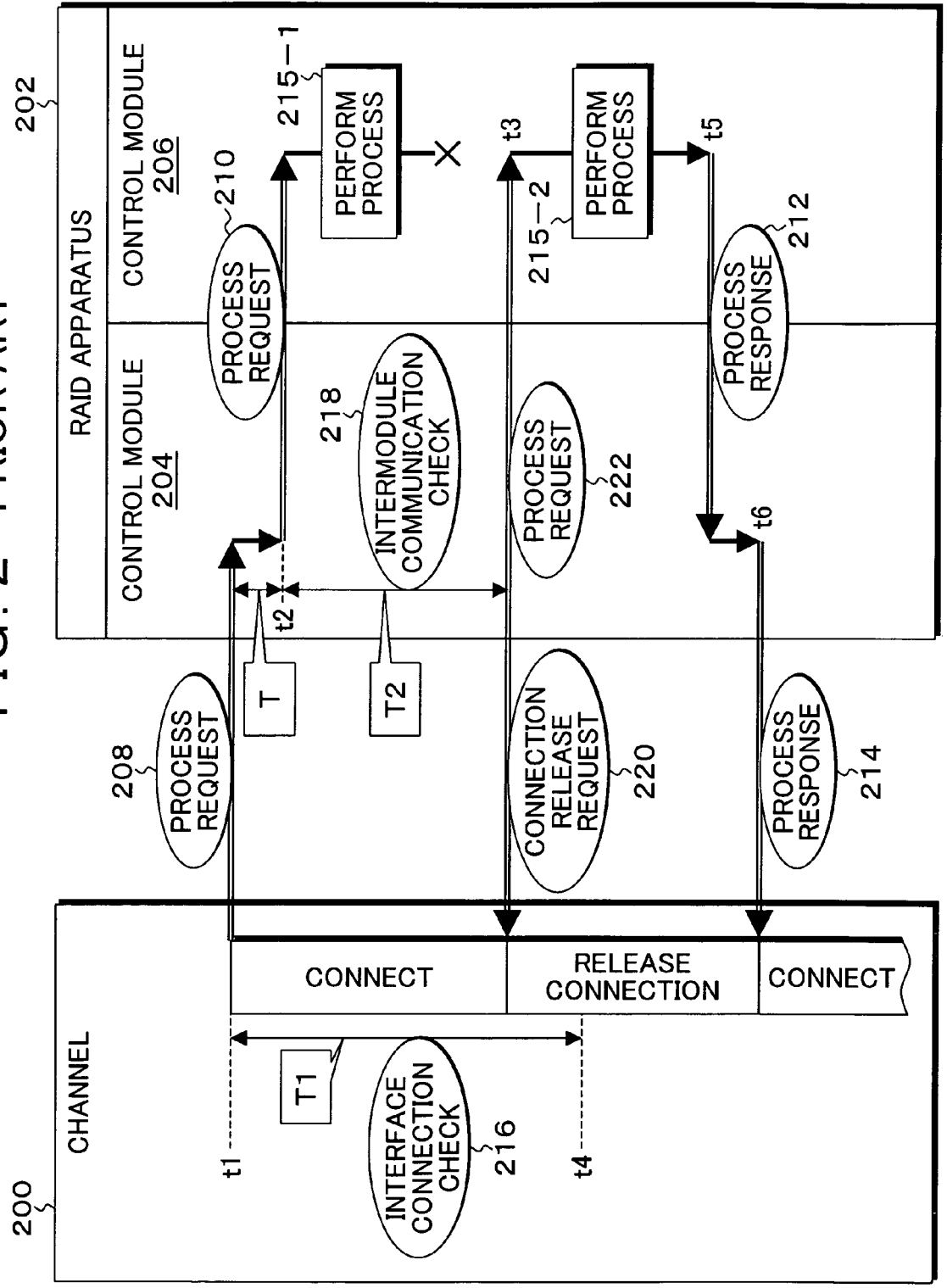
FIG. 2 is a drawing for describing a process when intermodule communication connection is timed out in the conventional example of FIG. 1.
Figure 3:
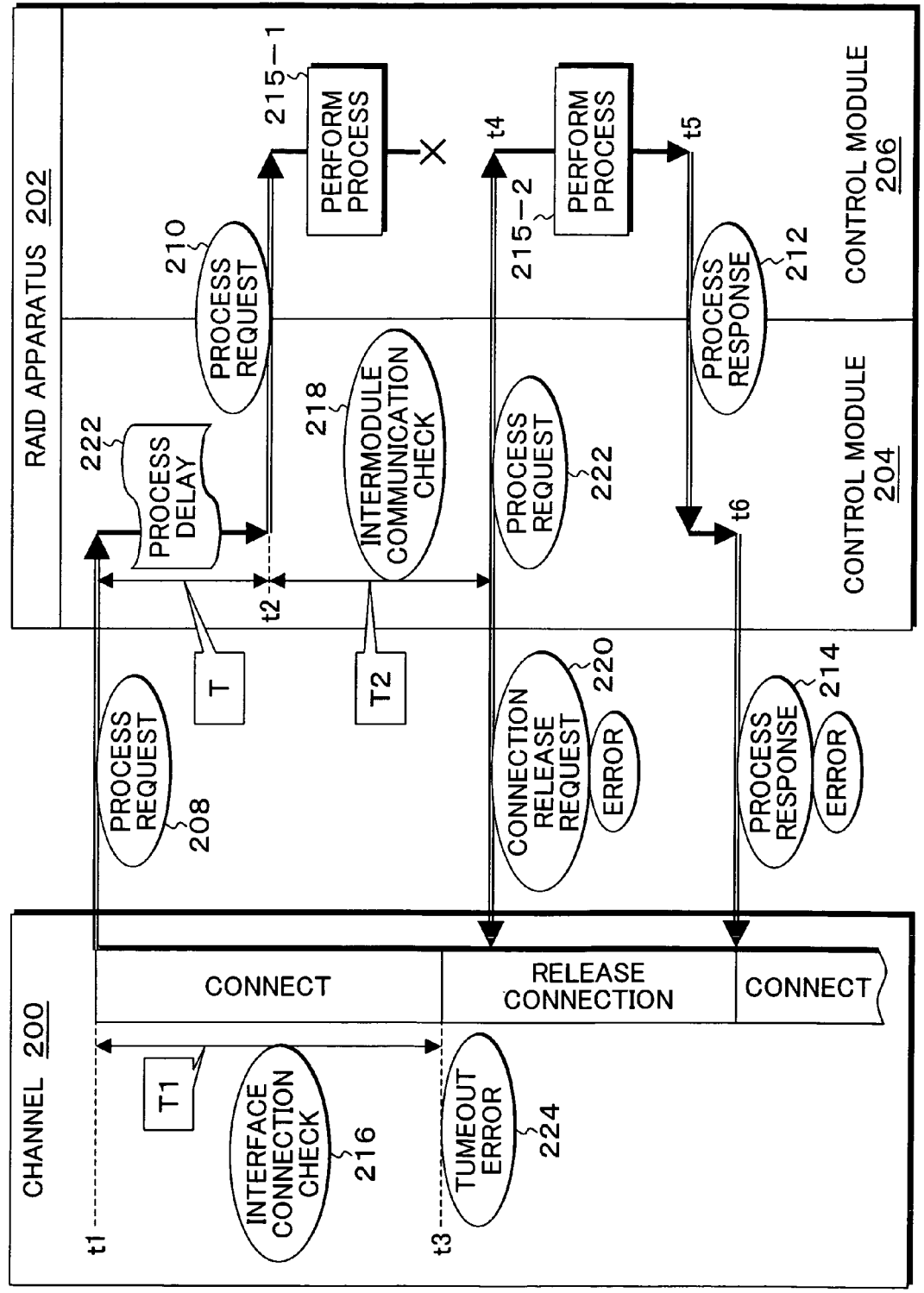
FIG. 3 is a drawing for describing a problem in which channel-interface connection check is timed out before intermodule communication connection is timed out in the conventional example of FIG. 1.
Figure 4:
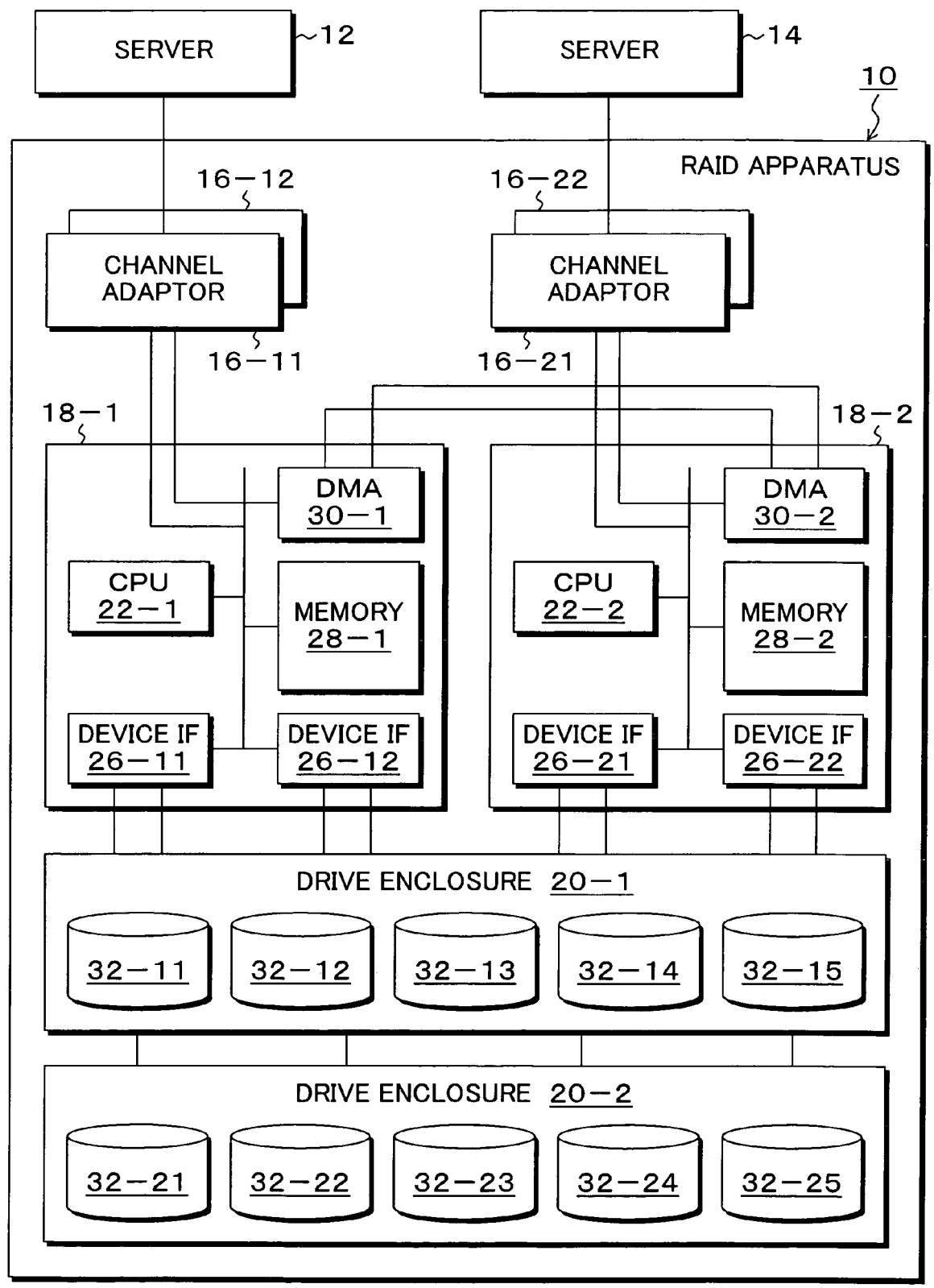
FIG. 4 is a block diagram of a hardware structure of a RAID apparatus to which the present invention is applied.

FIG. 4 is a block diagram of a hardware structure of a RAID apparatus to which the present invention is applied. In FIG. 4, a RAID apparatus 10 includes channel adaptors 16-11 to 16-22, control modules 18-1 and 18-2, and drive enclosures 20-1 and 20-2. The control module 18-1 has connected thereto, for example, a server 12 as a host device via the channel adaptor 16-11. The control module 18-2 has connected thereto a sever 14 via the channel adaptor 16-21. Here, for example, the server 12 is a global server, while, for example, the server 14 is an open server. The control modules 18-1 and 18-2 have the same structure, and each include a CPU 22, device interfaces 26-11, 26-12, 26-21, and 26-22, memories 28-1 and 28-2, and DMA processing units 30-1 and 30-2. Furthermore, the drive enclosures 20-1 and 20-2 include, for example, disk devices 32-11 to 32-15 and 32-21 to 32-25, respectively, using hard disk drives. Here, a minimum structure of the RAID apparatus 10 is depicted as an example, and as a maximum structure, the two control modules 18-1 and 18-2 can be increased to eight. Also, the number of drive enclosures can be increased as required by using an expanded cabinet. Also, the memories 28-1 and 28-2 provided in the control modules 18-1 and 18-2, respectively, are allocated a use area as a cache memory and an allocation area of a control table required for input/output control.

Figure 5A:
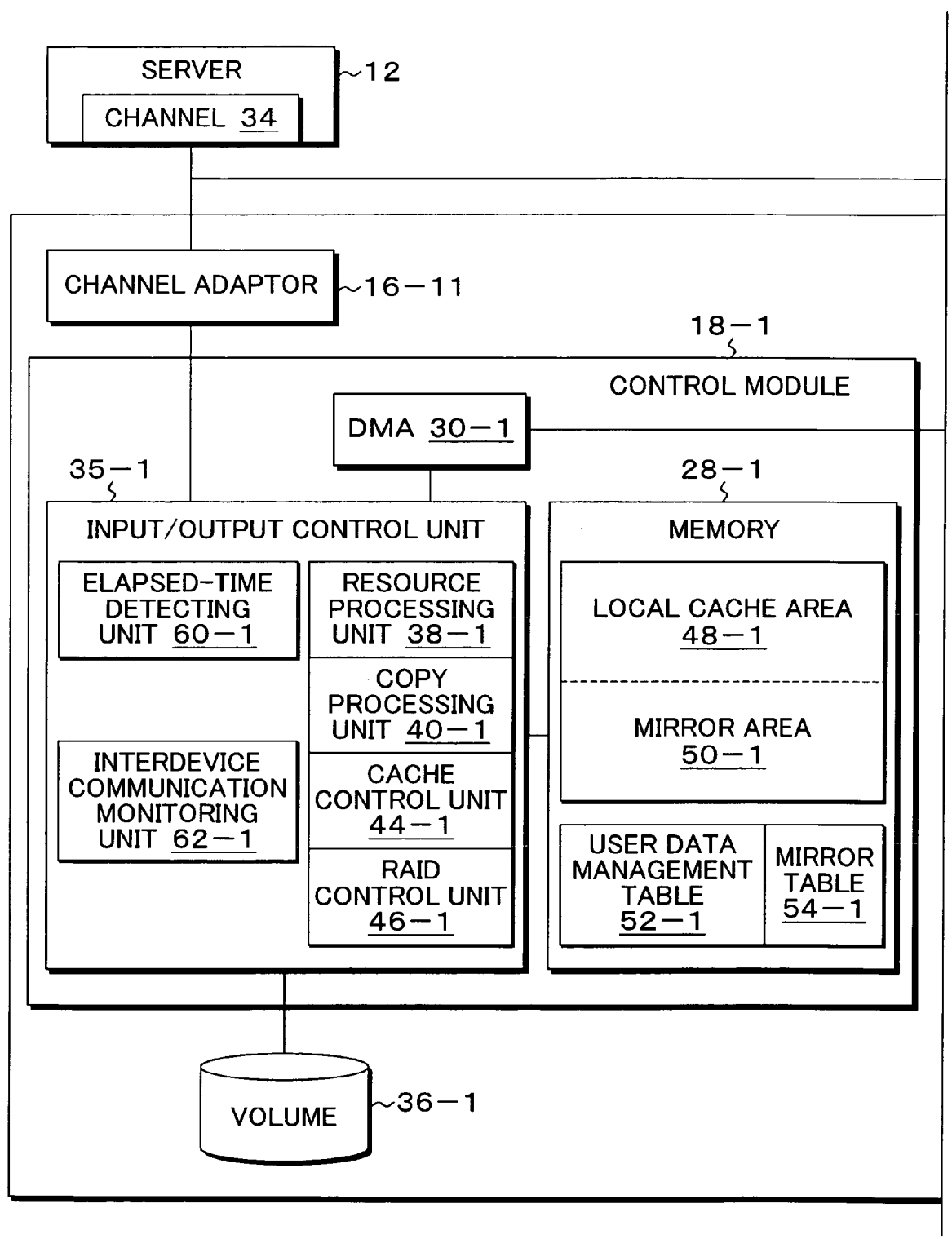
FIGS. 5A and 5B block diagrams of a functional structure of the RAID apparatus according to the present invention.
Figure 5B:
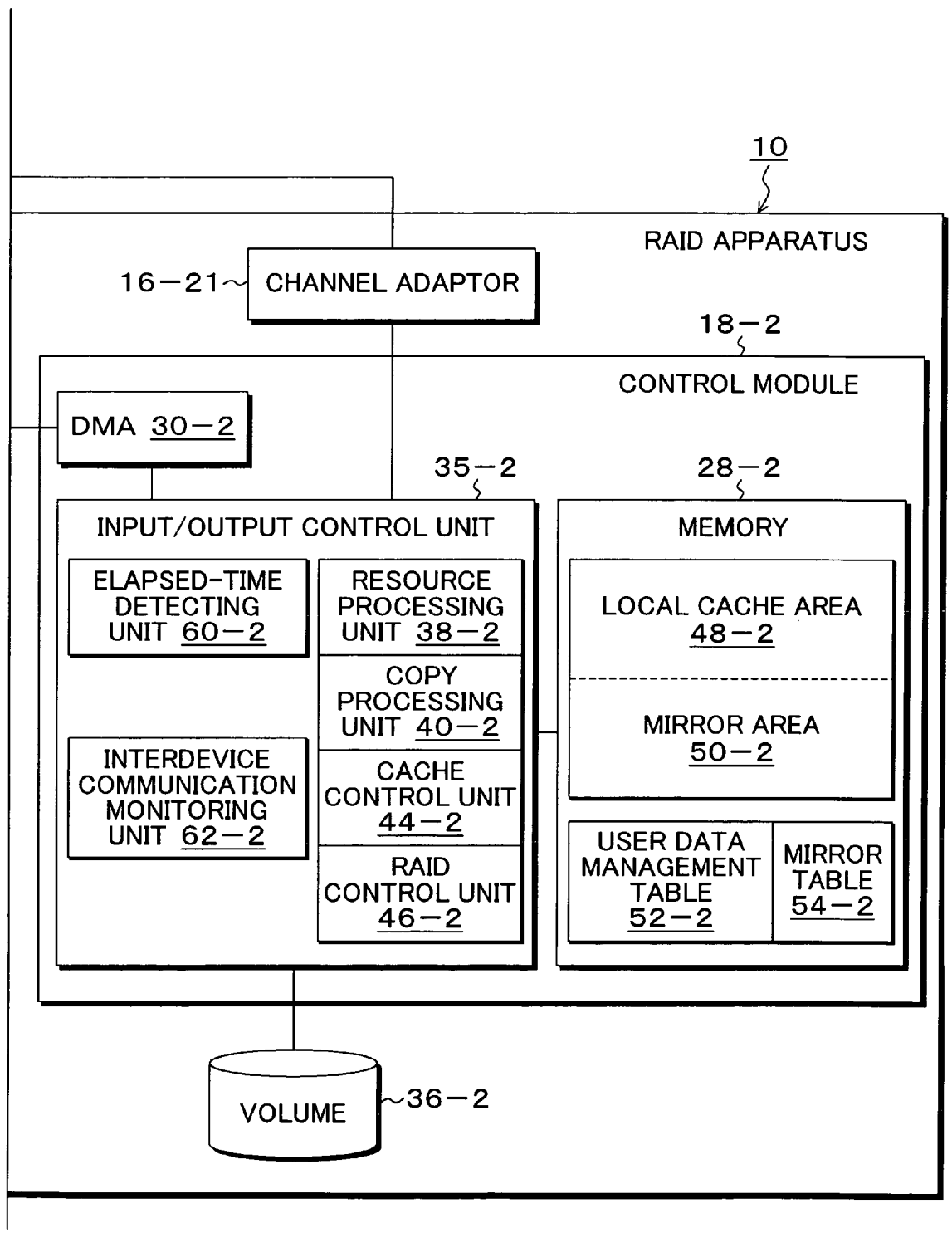

FIGS. 5A and 5B are block diagrams of a functional structure of the RAID apparatus according to the present invention. In FIGS. 5A and 5B the control modules 18-1 and 18-2 provided in the RAID apparatus 10 are connected to a channel 34 of the server 12 via the channel adaptors 16-11 and 16-21, respectively. When an input/output request to the RAID apparatus 10 is generated in the server 12, the channel 34 issues a command corresponding to the input/output request after a channel interface connection is established. After issuing a command to the RAID apparatus 10, the channel 34 waits for a normal end response from the RAID apparatus 10, detects an elapsed time from the establishment of interface connection, and performs a monitoring process through an interface connection check ICC for monitoring a timeout time T1 set in advance. In the channel 34, when a normal end response to the issued command is not obtained from the RAID apparatus 10 within the timeout time T1 of the interface connection check, a timeout error is determined, thereby separating the interface connection with the RAID apparatus 10, determining an error end, and suppressing subsequent input/output processes. The control modules 18-1 and 18-2 of the RAID apparatus 10 have the same functional structure. This is described below for the control module 18-1. The control module 18-1 includes an input/output control unit 35-1, and to the input/output control unit 35-1, a logical volume 36-1 is connected.

The input/output control unit 35-1 includes a resource processing unit 38-1, a copy processing unit 40-1, a cache control unit 44-1, and a RAID control unit 46-1. The resource processing unit 38-1 performs an exclusive process or monitoring on an input/output request from the server 12, which is a host device. The copy processing unit 40-1 performs a copy process in units of volumes within the RAID apparatus or with another external RAID apparatus. The cache control unit 44-1 performs user-data management and cache control. In the user-data management in the cache control unit 44-1, a user file in which an input/output process has been performed on the volume 36-1 is managed by using a user-data management table 52-1 provided in the memory 28-1. The user-data management table 52-1 has been made redundant, and a table having the same content is provided as a mirror table 54-2 in the memory 28-2 of the control module 18-2. The same goes for the control module 18-2 side, wherein a user-data management table 52-2 is provided in the memory 28-2, and a mirror table 54-1 having the same content is provided in the memory 28-1 of the control module 18-1. Therefore, when the user-data management table 52-1 is updated by the cache control unit 44-1 of the control module 18-1, by using an intermodule communication by the DMAs 30-1 and 30-2 after updating, the content of the mirror table 54-2 provided in the memory 28-2 of the control module 18-2 is simultaneously updated for redundancy. Such redundancy in which the user-data management tables 52-1 and 52-2 are provided with the mirror tables 54-1 and 54-2, respectively, having the same content is to allow, when either one of the control modules 18-1 and 18-2 degenerates due to a failure, a process before degeneration to be immediately taken over at the normal control module side. Also, the cache control unit 44-1 manages a cache memory for a read request and a write request from the server 12 to decide whether a hit occurs or not for the read request or the write request and perform a schedule process, such as staging or write-back. A cache area of the memory 28-1 managed by the cache control unit 44-1 is divided into a local cache area 48-1 and a mirror area 50-1. The local cache area 48-1 and the mirror area 50-1 are each assigned a half of the entire cache area. The local cache area 48-1 has stored therein user data associated with input/output requests of the server 12. The user data is classified into read data and write data (dirty data). The read data is data subjected to staging from the volume 36-1 to the local cache area 48-1 upon a read request of the server 12. Also, the write data (dirty data) is data written upon a write request of the server 12, and is made redundant by writing the same data in the mirror area 50-2 of the other control module 18-2 for data assurance. The relation between the local cache area 48-1 and the mirror area 50-1 in the memory 28-1 similarly applies to the memory 28-2 of the control module 18-2, and its own local cache area 48-2 has stored therein read data and write data associated with input/output requests from the server 12. For the write data, the same data is stored in the mirror area 50-1 of the other control module 18-1 for data assurance through redundancy. Redundancy by writing write data in the mirror areas 50-1 and 50-2 of the local cache areas 48-1 and 48-2 allows, when either one of the control modules 18-1 and 18-2 degenerates due to a failure, the user data before degeneration to be taken over as it is at the normal control module side. The relation between the local cache areas 48-1 and 48-2 and the mirror areas 50-1 and 50-2 in the control modules 18-1 and 18-2 adopts a cyclic structure which effectively functions when at least three control modules are provided in the RAID apparatus 10. In the cyclic structure formed of three or more control modules, when one of the plurality of control modules degenerates due to a failure, write data located on the degenerating control module is taken over by a normal control module retaining the mirror area for the write data. When one of the three control modules degenerates, the redundancy structure can be maintained with the remaining two control modules. When another one further degenerates, redundancy is released. The RAID control unit 46-1 controls an input/output process on the disk enclosure side at a RAID level, such as RAID level 3, RAID level 4, or RAID level 5. For example, in the control module 18-1, an input/output process is performed on the volume 36-1 at RAID level 4. On the other hand, for the RAID control unit 46-2 of the control module 18-2, an input/output process is performed on the volume 36-2 at RAID level 5. Furthermore, the input/output control unit 35-1 is provided with an elapsed-time detecting unit 60-1 and an interdevice communication monitoring unit 62-1, as a function for monitoring an interdevice communication connection in the present invention, that is, as a function for monitoring an intermodule communication connection between the control modules 18-1 and 18-2. The elapsed-time detecting unit 60-1 detects an elapsed time T from the time when the control module 18-1 receives a process request from the channel 34 of the server 12 to the time when a hierarchical-process request is transmitted to the control module 18-2 upon the establishment of an intermodule communication connection by the DMAs 30-1 and 30-2. The process request from the channel 34 of the server 12 requiring an intermodule communication between the control modules 18-1 and 18-2 includes a process request for a user-data managing process for making the user-data management table 52-1 redundant, and a write request for making writing of write data in the local cache area 48-1 redundant. Other than that, an appropriate process request is also included in which, with a process request to the control module 18-1, a process is requested of the control module 18-2 located lower than the control module 18-1 and a response is made with the process results of the control module 18-2. When an intermodule communication connection is established between the control modules 18-1 and 18-2 for starting the communication, the interdevice communication monitoring unit 62-1 calculates a variable timeout time Tx by subtracting T detected by the elapsed-time detecting unit 60-1 from a predetermined fixed timeout time T2 for monitoring an intermodule communication as:

$$Tx=T2-T.$$

With this variable timeout time Tx, the elapsed time T of the intermodule communication is monitored. Here, the fixed timeout time T2 for starting an intermodule communication in the control modules 18-1 and 18-2 is set shorter than the timeout time T1 of the interface connection check ICC being performed at the channel 34 side. Before the timeout time T1 of the interface connection check in the channel 34 of the server 12 expires, the timeout time T2 expires at the RAID apparatus 10 side. With a timeout error, a request for releasing the connection with the channel 34 is made, thereby preventing the occurrence of a timeout error at the channel 34 side. While the elapsed time T of the intermodule communication connection is monitored by using the calculated variable timeout time Tx, if a process end response from the control module 18-2 side is not obtained even though the elapsed time T reaches the variable timeout time Tx, the interdevice communication monitoring unit 62-1 determines a timeout error of the intermodule communication connection, and requests the channel 34 to separate the interface connection, thereby preventing the occurrence of a timeout error due to an overrun of the timeout time T1 of the interface connection check (ICC) at the channel 34 side. After the interface connection with the channel 34 is separated because of a timeout error due to a lapse of the variable timeout time Tx of the intermodule communication connection, monitoring is performed as to whether a normal end response from the control module 18-2 that requested to perform the process is received. When a normal end response is obtained from the control module 18-2, an interface connection request is made to the channel 34. Upon reception of this, the channel 34 establishes an interface reconnection. At this time, a normal end response received from the control module 18-2 is transmitted from the control module 18-1 to the channel 34, thereby normally ending the process request from the channel 34. Such a functional structure of the control module 18-1 side similarly applies to the control module 18-2. The input/output control unit 35-2 includes a resource processing unit 38-2, a copy processing unit 40-2, a cache control unit 44-2, and a RAID control unit 46-2. Also, to monitor the intermodule communication connection when a process request is made from the channel 34 of the server 12 to the control module 18-2, an elapsed-time detecting unit 60-2 and an interdevice communication monitoring unit 62-2 are provided. Furthermore, for the memory 28-2, in addition to its local cache area 48-2, a mirror area 50-2 corresponding to the local cache area 48-1 at the control module 18-1 side is provided. Also, in addition to its user-data management table 52-2, a mirror table 54-2 for making the user-data management table 52-1 of the control module 18-1 redundant is provided.

FIG. 6 depicts a functional structure in which the control module 18-1 provided in the RAID apparatus 10 performs a process of monitoring the intermodule communication connection when executing a process request from the channel 34 of the server 12. In FIG. 6, the channel 34 of the server 12 makes a process request to the control module 18-1 of the RAID apparatus 10. Based on this, the control module 18-1 establishes an intermodule communication connection by the DMAs 30-1 and 30-2, thereby causing the functions of the elapsed-time detecting unit 60-1 and the interdevice communication monitoring unit 62-1 to be effective for monitoring the intermodule communication connection when the control module 18-2 is requested to perform a hierarchical process. Also, when an input/output request from the channel 34 of the server 12 is a user-data write request, storing or updating of the write data in the local cache area 48-1 of the memory 28-1 is performed. Furthermore, in association with the updating of the user data, registration or updating of the user-data management table 52-1 is performed. These are each depicted as an effective function. For the control module 18-2, which is a mirror destination for redundancy, the mirror area 50-2 in the memory 28-2 corresponding to the local cache area 48-1 becomes effective, and also the mirror table 54-2 corresponding to the user-data management table 52-1 becomes effective. Therefore, these are depicted as effective portions.

FIG. 7 is a drawing for describing a process of monitoring the intermodule communication connection according to the present invention in the functional structure of FIG. 6. FIG. 7 depicts processes in the channel 34 and the control modules 18-1 and 18-2 provided in the RAID apparatus 10, with the vertical axis representing an elapsed time t. In the channel 34, when a process request to the RAID apparatus 10 is generated at a time t1, a channel interface state 64 is set as connect 65, and then a process request 66 is transmitted to the control module 18-1 of the RAID apparatus 10. In the control module 18-1, a timer is started at the time t1 when the process request 66 is received from the channel 34, and then at a time t2, an elapsed time T until a process request 72 is transmitted from the control module 18-1 to the control module 18-2 with an intermodule communication connection being established is detected. Here, if a process delay 70 occurs due to some reason from the time when the process request 66 is received at the time t1 until the time when the process request 72 is issued at the time t2 with the intermodule communication connection being established, the elapsed time T is increased by that delay. In the present invention, based on the elapsed time T detected when the intermodule communication connection is established at the time t2, a variable timeout time Tx is calculated by subtracting the elapsed time T from the times t1 to t2 from the predetermined fixed timeout time T2. With the use of this variable timeout time Tx, an intermodule communication check 74 after the time t2 onward is executed. On the other hand, in the channel 34, the process request 66 is issued at the time t1 to the RAID apparatus 10 through an interface connection, and at the same time, a predetermined timeout time T1 is set for performing an interface connection check (ICC) 68. Here, the fixed timeout time T2 of the intermodule communication for use in calculating the variable timeout time Tx at the time t2 is a time shorter than the timeout time T1 of the interface connection check 68 in the channel 34. At the time t2, the process request 72 is issued to the control module 18-2. At a time t3 while a process execution 82-1 is being performed in the control module 18-2, if the elapsed time T2 from the start time t2 of the intermodule communication connection exceeds the variable timeout time Tx, a timeout error occurs. Based on this timeout error in the intermodule communication check 74, the control module 18-1 makes a connection release request 78 to the channel 34. Upon reception of this, the channel 34 sets the channel interface state 64 as release connection 80. As such, with a timeout error of the intermodule communication check occurring earlier due to the process delay 70 in the control module 18-1 at the RAID apparatus 10 side, in the channel 34, a connection release request 78 is made at the time t3, which is earlier than a time t4 when the timeout time T1 of the interface connection check 68 expires, to separate the interface connection, thereby preventing the occurrence of a timeout error of the interface connection check 68 in the channel 34 even though a process delay occurs at the RAID apparatus 10 side. Also, when a timeout error of the intermodule communication is determined at the time t3 to release the connection with the channel 34, the possibility of the occurrence of an error in the process execution 82-1 in the control module 18-2 is high. Therefore, the process request 72 issued at the time t2 is cancelled, and then again a process request 76 having the same content is issued to the control module 18-2 with an interdevice communication being established, thereby performing a same process execution 82-2 and then waiting for a process response from the control module 18-2. When a process response 84 is obtained at a time t5, the control module 18-1 requests an interface reconnection of the channel 34 at a time t6. Upon establishment of connection 86, a process response 85 is transferred, thereby ending the series of processes. Here, even if a process response for the process execution 82-1 is obtained from the control module 18-2 after the timeout error, the first process request 72 is cancelled at the time of the timeout error, and therefore this process response is discarded.

Figure 8:
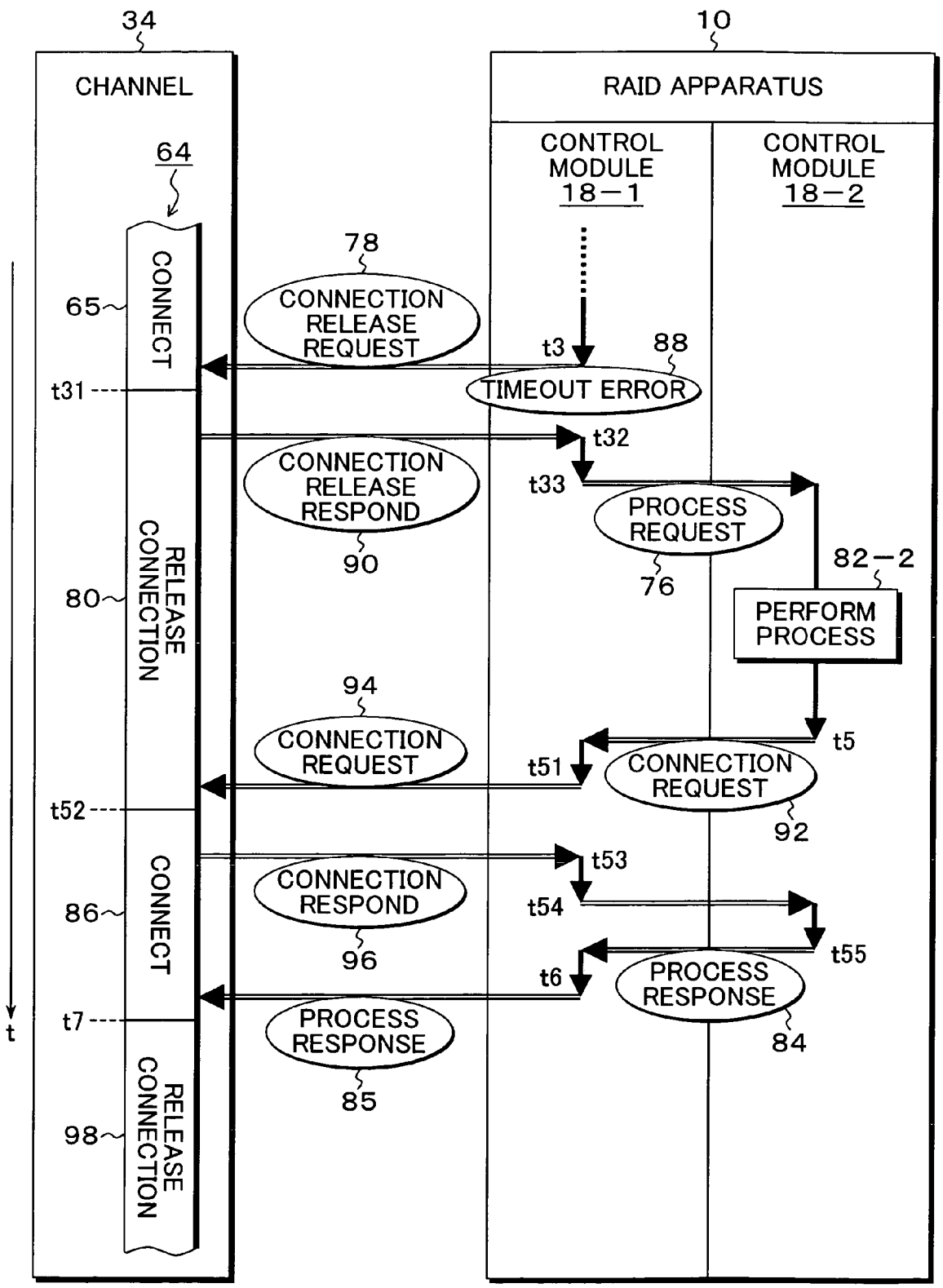
FIG. 8 is a diagram showing details of release of interface connection of a channel shown in FIG. 7 and reconnection after release.

FIG. 8 is a diagram showing details of release of the interface connection of the channel shown in FIG. 7 when a timeout error of the intermodule communication check occurs and reconnection after release. In FIG. 8, if the elapsed time of the intermodule communication exceeds the variable timeout time Tx in the control module 18-1 to cause a timeout error 88, a connection release request 78 is made to the channel 34. Upon reception of this connection release request 78, the channel 34 changes the channel interface state 64 from connect 65 continued so far to release connection 80, and then returns a connection release response 90 to the control module 18-1. Upon reception of the connection release response 90, the control module 18-1 cancels the process request 72 issued at the time t2 because the possibility of the occurrence of an error in the process execution 82-1 of the control module 18-2 based on the process request 72 at the time t2 shown in FIG. 7 is high, and then again issues a process request 76 having the same content to the control module 18-2, with an interdevice communication being established, to perform the process execution 82-2 having the same content and then wait for a process response from the control module 18-2. In the control module 18-2, when the process execution 82 is normally ended at the time t5, the control module 18-2 issues a connection request 92 to the control module 18-1. Upon reception of this, the control module 18-1 issues a connection request 94 to the channel 34 at a time t51. Therefore, the channel 34 sets the channel interface state 64 as connect 86 to establish an interface connection, and returns a connection response 96 to the control module 18-1. The connection response 96 is further reported to the control module 18-2 through the currently-established intermodule communication. The control module 18-2 receiving this connection response 96 from the channel reports, through the intermodule communication, a process response 84 indicative of a normal end to the control module 18-1. Upon reception of this, the control module 18-1 reports a process response 85 to the channel 34 through the interface connection so as to interruptively respond to the channel 34 that the process after the timeout error occurs in the intermodule communication in the RAID apparatus 10 side has normally ended. Determining a normal end, the channel 34 sets at a time t7 the interface state as release connection 98.

Figure 9A:
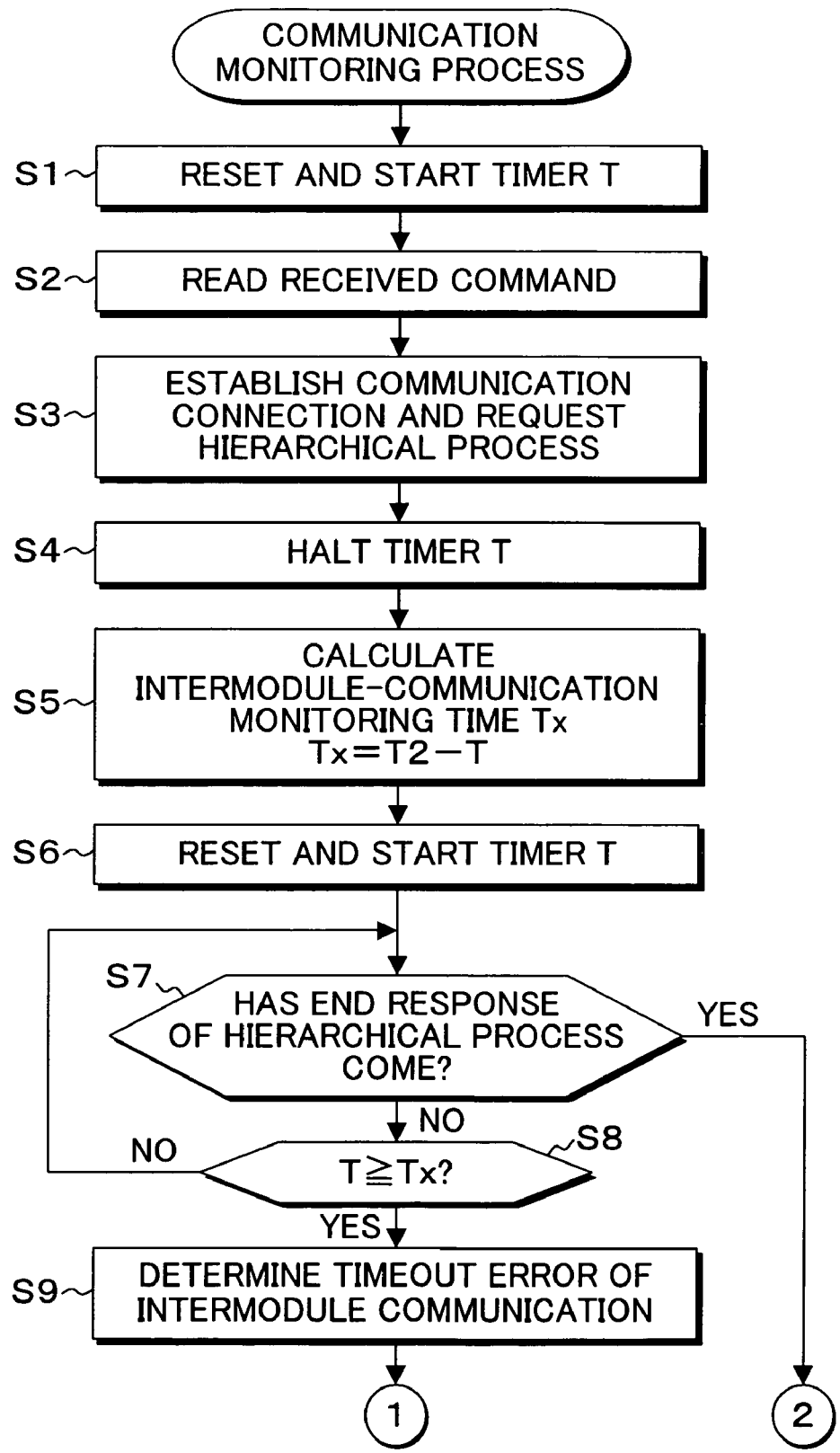
FIGS. 9A and 9B are flowcharts of an intermodule-communication monitoring process according to the present invention supporting FIGS. 7 and 8.
Figure 9B:
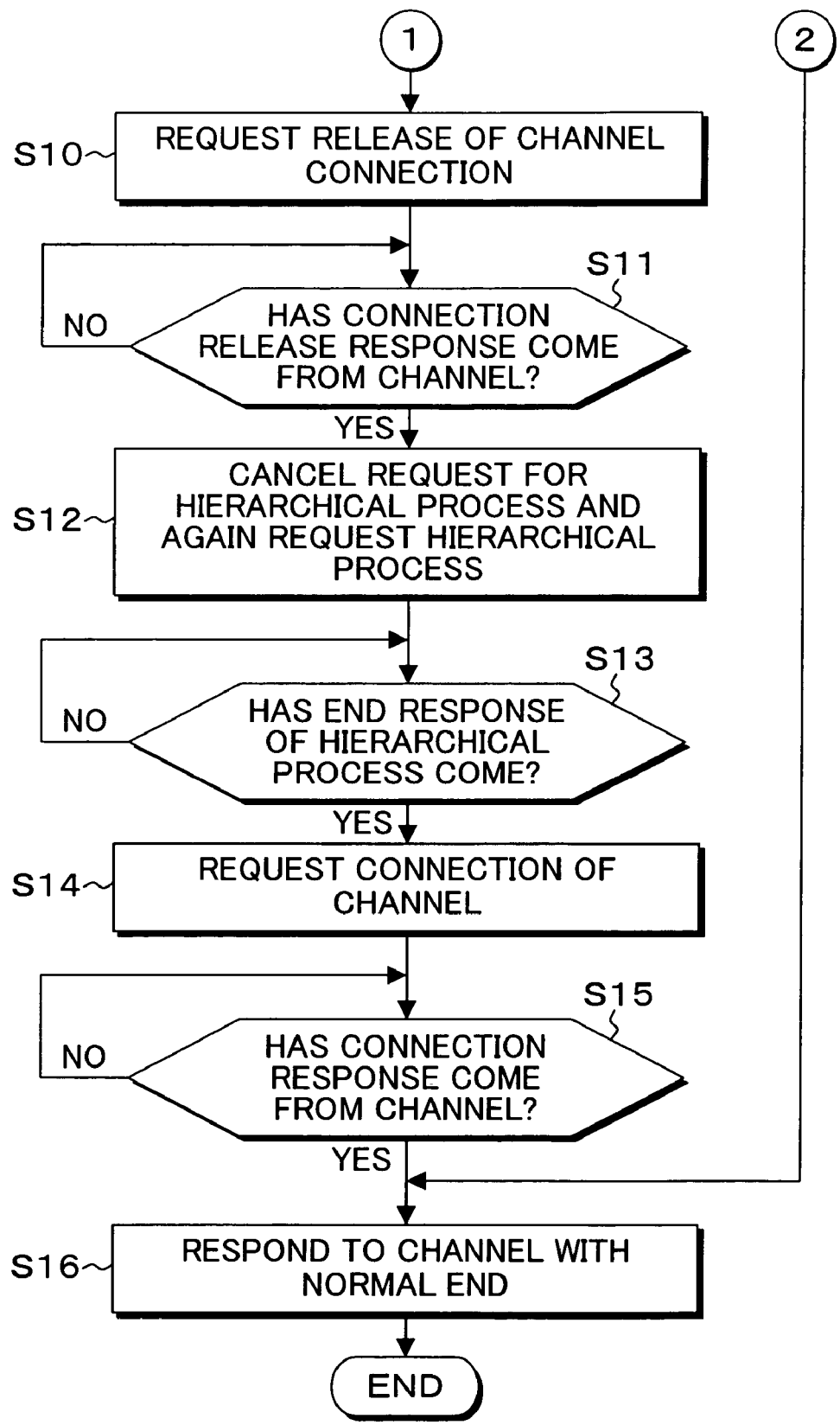

FIGS. 9A and 9B are flowcharts of an intermodule-communication monitoring process according to the present invention supporting FIGS. 7 and 8, and the flow is executed as process functions of the elapsed-time detecting unit 60-1 and the interdevice communication monitoring unit 62-1 provided in the input/output control unit 35-1 shown in FIG. 6. In FIGS. 9A and 9B, in the intermodule-communication monitoring process, the control module 18-1 receiving a process request from the channel resets and starts a timer T at step S1, and then reads the received command at step S2 to recognize from the command content that a process is requested with an intermodule communication with the control module 18-2 being established. Then at step S3, an intermodule communication with the control module 18-2 is established and a hierarchical process is requested. At step S4, the timer T is halted. At this time, the time T has retained therein an elapsed time from the time when the process request is received from the channel until the time when the hierarchical process is requested with an intermodule communication being established. Next at step S5, the variable timeout time Tx for monitoring the intermodule communication is calculated as $Tx=T2-T.$ Then at step S6, the timer T is reset and started. At step S7, it is checked whether an end response of the hierarchical process has come from the control module 18-2. If an end response has not come, it is monitored at step S8 whether the elapsed time T is equal to or larger than the variable timeout time Tx calculated at step S5. Here, if no process delay occurs from the time when the control module 18-1 receives a command from the channel until the time when a hierarchical-process request is made to the control module 18-2 with an intermodule communication being established, an end response of the hierarchical response comes from the control module 18-2 before the elapsed time T reaches the variable timeout time Tx. This is determined at step S7, and then the procedure goes to step S15, and then a response is made to the channel with a normal end. On the other hand, if the process is delayed and take time from the time when the control module 18-1 receives a command from the channel until the time when a hierarchical-process request is issued to the control module 18-2 with an intermodule communication connection being established, the elapsed time T reaches the timeout time Tx at step S8 before an end response of the hierarchical process is obtained at step S7. The procedure then goes to step S9, wherein a timeout error of the intermodule communication is determined. When this timeout error is determined, a request for releasing the interface connection is made to the channel 34 at step S10. When a interface-connection-release response is obtained from the channel 34 at step S11, the procedure goes to step S12, wherein the request for the hierarchical process at step S3 is cancelled, and a hierarchical process is again requested of the control module 18-2. At step S13, whether an end response of the hierarchical process has come from the control module 18-2 is checked. When a process response is obtained from the control module 18-2, the procedure goes to step S14, wherein an interface connection is requested of the channel 34. When an interface-connection response is obtained from the channel at step S15, a response with a normal end is made to the channel 34 at step S16.

FIG. 10 is a drawing for describing a communication-connection monitoring process according to the present invention when a redundancy process is performed for an input/output request from the server through an intermodule communication with the control modules 18-1 and 18-2 of the RAID apparatus. In FIG. 10, it is assumed that an input/output request 100, such as a user-data write request, is generated at a time t1 from the channel 34 to the control module 18-1 of the RAID apparatus 10. In association with the generation of the input/output request 100, in the channel 34, the monitoring function of an interface connection check 102 is made effective. For the channel interface connection state 64 indicative of connect 101, monitoring a connection elapsed time with the timeout time T1 is started. The control module 18-1 of the RAID apparatus 10 receiving the input/output request 100 executes an input/output process 104 from a time t2. In this input/output process 104, since the input/output request 100 is a write request, for example, writing write data in the local cache area 48-1 of FIG. 6 or updating already-written write data is performed. At the same time, an intermodule communication connection with the control module 18-2 is established, and a transaction of an input/output-information redundancy process 106 is executed. This input/output-information redundancy process 106 is a process of storing or updating the same write data in the mirror area 50-2 of the control module 18-2 corresponding to the local cache area 48-1. Also, in the control module 18-1, the timer T is started at the time of the establishment of the intermodule communication connection at the time t2 to start detection of the elapsed time. When the input/output process 104 in the control module 18-1 and the input/output-information redundancy process 106 in the control module 18-2 are completed at a time t3, the timer T is halted. With this, the timer T has retained therein an elapsed time T required for the transactions of the input/output process 104 and the input/output-information redundancy process 106 during the times t2 to t3. Thus, in the present invention, based on the elapsed time T of the first transaction, a variable timeout time Tx for monitoring an intermodule communication connection in a transaction associated with the next user-data management is calculated by subtracting the elapsed time T from the fixed timeout time T2. At a time t4, an intermodule communication connection is again established, and a user-data managing process 110-1 is performed in the control module 18-1. At the same time, with the use of the intermodule communication, user-data-management redundancy process 112-1 is performed in the control module 18-2. Simultaneously with the start of the transaction of user-data management at the time t4, the timer T is started to detect an elapsed time, and monitoring with the calculated variable timeout time Tx is started. Then, if the elapsed time T from the transaction start time of the user-data management at the time t4 reaches the variable timeout time Tx at a time t5, a timeout error 116 is determined, and an interface-connection-release request 118 is issued to the channel 34. Upon reception of this, the channel 34 sets the channel interface state 64 as release connection 120. Therefore, at the timeout time T1 of the interface connection check 102 in the channel 34, before the time reaches a time t6, the interface connection is released based on the timeout error of the intermodule communication connection check at the RAID apparatus 10 side. With two transactions associated with the intermodule communication being successively performed at the RAID apparatus 10 side, even though the process takes time, a timeout error of the interface connection check does not occur in the channel 34. Also, if the timeout error 116 of the intermodule communication connection is determined at the time t5 to release the connection with the channel 34 (if a interface-connection-release response is obtained from the channel 34), the possibility of the occurrence of an error in the user-data managing process 110-1 by the control module 18-1 and the user-data-management redundancy process 112-1 by the control module 18-2 is high. Therefore, the transaction of user-data management starting at the time t4 is cancelled, and a transaction of a user-data managing process is again started to execute a user-data managing process 110-2. Simultaneously, with the use of the intermodule communication, the control module 18-2 executes a user-data-management redundancy process 112-2. If the control module 18-2 ends the redundancy process at a time t7 and issues a process response 124 indicative of a normal end, the control module 18-1 makes an interface connection request 126 to the channel 34 at a time t8 based on the process response. With the channel interface state 64 being switched to connection 128, the input/output request 100 in the channel 34 can be normally ended. Here, details of the connection release request 118 at the time t5 in FIG. 10 and a process response 126 are identical to those shown in FIG. 8. Also, even if a process response of the user-data-management redundancy process 112-1 is obtained from the control module 18-2 after the timeout error, the transaction of the redundancy process at the time t4 is cancelled at the time of the timeout error, and therefore this process response is discarded.

Figure 11A:
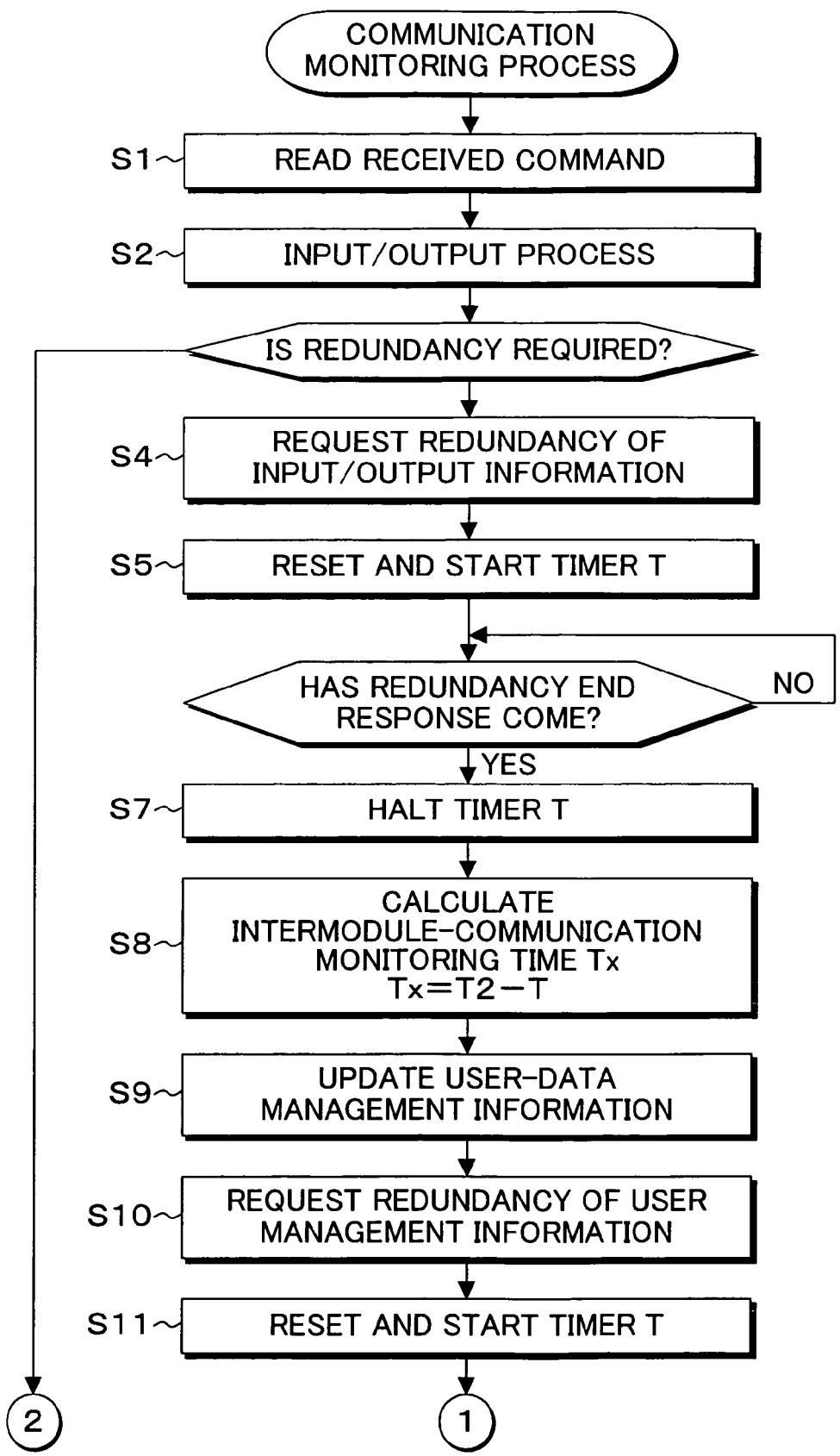
FIG. 11A is a flowchart of an intermodule-communication monitoring process according to the present invention supporting FIG. 10.
Figure 11B:
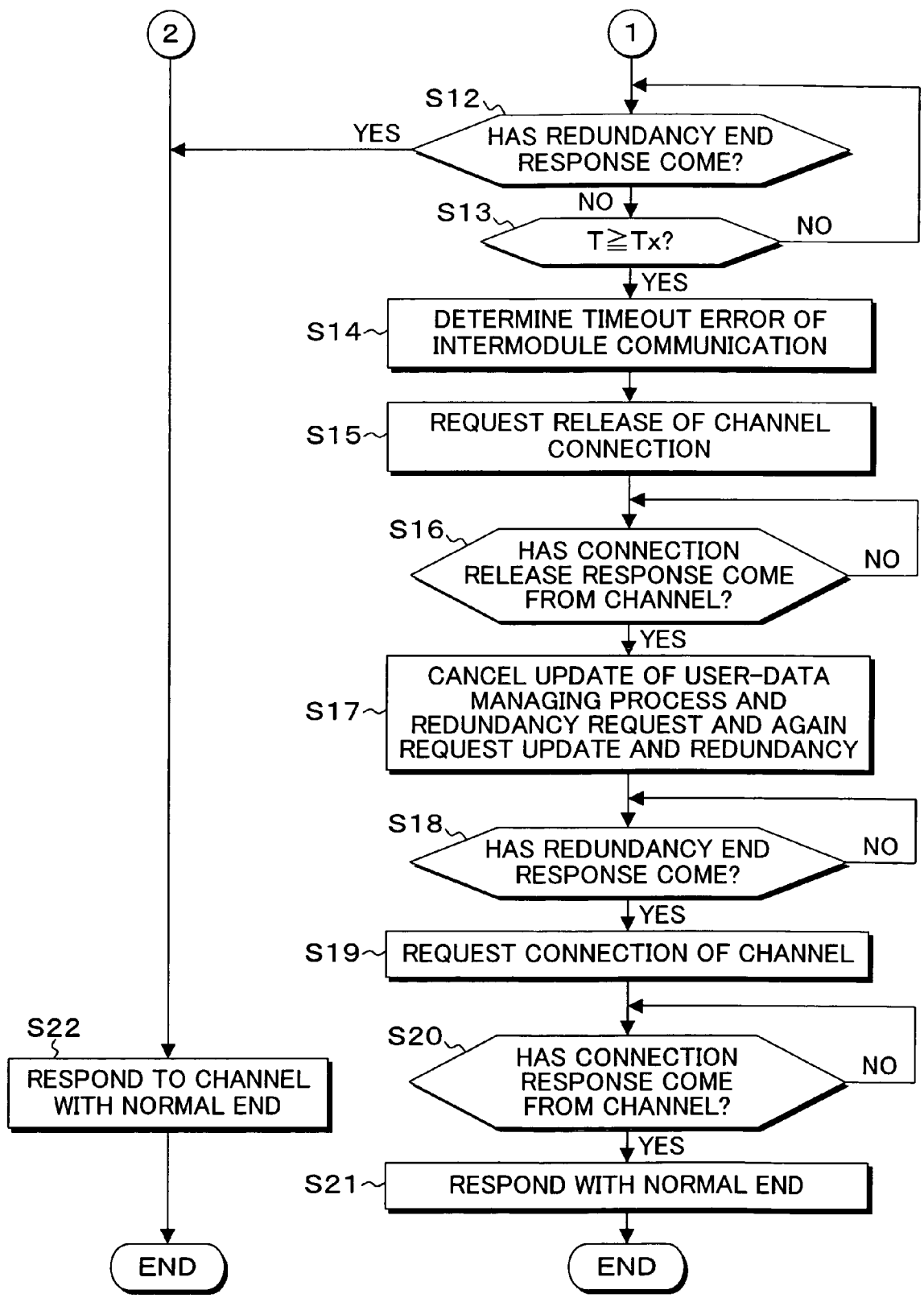
FIG. 11B is the flowchart continued from FIG. 11A of the intermodule-communication monitoring process.

FIGS. 11A and 11B depict flowcharts of the intermodule-communication connection monitoring process according to the present invention supporting FIG. 10. The flowchart shown in FIG. 11A is started when the control module 18-1 receives from the channel 34 an input/output request, for example, a write command, requiring a redundancy process through an intermodule communication. In the intermodule-communication-connection monitoring process, first at step S1, a command received from the channel 34 is read. Thereafter, at step S2, an input/output process for writing, for example, write data in the local cache area is executed. Then at step S3, it is checked whether a redundancy process is required. If a redundancy process is required, an intermodule communication is established at step S4 to request an input/output information redundancy process of the control module 18-2. At this time, at step S5, the timer T is reset and started to start detecting an elapsed time. Then at step S6, when a redundancy process response from the control module 18-2 as to storing of the write data in the mirror area is determined, the timer T is halted at step S7. With this, the timer T has retained therein an elapsed time required for a transaction for the first time requiring the storing in the local cache area in response to the write request and the storing in the mirror area for redundancy. Then, at step S8, a variable timeout time Tx for use in monitoring an intermodule communication is calculated by subtracting the elapsed time T from the fixed timeout time T2. At step S9, the user-data management information is updated, and then at step S10, an intermodule communication is established and a user-management-information redundancy process for the mirror table is requested. At this time, at step S11, the timer T is reset and started to detect an elapsed time. Then at step S12, it is checked whether a redundancy end response at the control module 18-2 side, that is, an end response of the redundancy process for the mirror table, has come. If no end response has come, it is determined at step S13 whether the elapsed time T reaches the variable timeout time Tx. When a redundancy end response from the control module 18-2 side as to user-data management is determined at step S12 before the elapsed time T reaches the variable timeout time Tx, the procedure goes to step S22, wherein a response is made to the channel 34 with a normal end, thereby ending the series of processes. On the other hand, when the elapsed time T reaches the variable timeout time Tx at step S13 before a redundancy end response is obtained, a timeout error of the intermodule communication is determined at step S14 of FIG. 11B. At step S15, an interface connection release request is made to the channel 34. The procedure then goes to step S16 of FIG. 11B. If an interface-connection-release response has come from the channel 34, the procedure goes to step S17, wherein the update of the user-data management information and the redundancy request are cancelled, and again updating the user-data management information and a redundancy request are executed. Then at step S18, a redundancy end response from the control module 18-2 as to user-data management is waited for. If a redundancy end response has come from the control module 18-2, an interface connection request is made to the channel 34 at step S19. When an interface connection is established from the channel 34 and a connection response is obtained at step S20, a response is made with a normal end at step S21, thereby ending the series or processes. Here, at step S3, if the input/output process obtained from the received command is a process not requiring redundancy, that is, a read request, for example, a response is made to the channel 34 with a normal end, thereby ending the series of processes.

Also, in the embodiment shown in FIGS. 7 to 11B, as shown in FIG. 6, an input/output request is made from the server 12 to the control module 18-1 and a process accompanying an intermodule communication when the control module 18-1 serves as a primary module and the control module 18-2 servers as a secondary module is taken as an example. If an input/output request is issued from the server 12 to the control module 18-2, the control module 18-2 side serves as a primary module and the control module 18-1 side serves as a secondary. In this case, the process functions of the control modules 18-1 and 18-2 in FIG. 6 for monitoring an intermodule communication connection are switched. Specifically, the functions of the elapsed-time detecting unit 60-2 and the interdevice communication monitoring unit 62-2 provided in the control module 18-2 of FIGS. 5A and 5B serving as a primary module become effective. Furthermore, in the above embodiment, intermodule communication monitoring applied to the RAID apparatus that processes an input/output request from the server as a host device is taken as an example. The present invention is not restricted to this, and can be similarly applied to the case where a plurality of processing devices are connected to a host device, an interdevice communication is performed among the plurality of processing devices and, for an input/output request of the host device to a specific processing device, another processing device is requested a hierarchical process. Still further, the present invention includes appropriate modifications without impairing the purpose or advantage of the present invention, and is not restricted by numerical values shown in the above embodiment.

What is claimed is:

1. A RAID apparatus including a first processing device and a second processing device that perform a volume input/output process, wherein a process request received by the first processing device through an interface connection with a host device is transmitted to the second processing device through an interdevice communication for a hierarchical process and an end response is transferred from the second processing device via the first processing device to the host device for releasing the interface connection, the RAID apparatus comprising:
   an elapsed-time detecting unit that detects an elapsed time from a time when the first processing device receives the process request from the host device until transmitting the process request to the second processing device through the interdevice communication; and
   an interdevice communication monitoring unit that calculates a variable timeout time by subtracting the elapsed time from a predetermined fixed timeout time for monitoring the interdevice communication between the first processing device and the second processing device, and monitors an elapsed time of the interdevice communication.

2. The RAID apparatus according to claim 1, wherein the fixed timeout time is a time shorter than a predetermined interface connection check time for monitoring an elapsed time of the interface connection between the host device and the first processing device.

3. The RAID apparatus according to claim 1, wherein when the elapsed time of the interdevice communication exceeds the variable timeout time, the interdevice communication monitoring unit requests the host device to separate the interface connection, and then when the end response is obtained from the second processing device, requests the host device for an interface reconnection and transmits the end response.

4. The RAID apparatus according to claim 1, wherein
   the elapsed-time detecting unit detects an elapsed time from a time when the first processing device receives the process request from the host device until transmitting a first process request to the second processing device through the interdevice communication to obtain an end response, and
   the interdevice communication monitoring unit calculates a variable timeout time by subtracting the elapsed time from the fixed timeout time, and monitors an elapsed time until a second process request is transmitted to the second processing device through an interdevice communication to obtain an end response.

5. The RAID apparatus according to claim 4, wherein the process request to be transmitted by the a first processing device to a second processing device through the interdevice communication is a process request for making process information associated with the input/output request redundant.

6. A system in which a process request received by first processing device through an interface connection with a host device is transmitted to the second processing device through an interdevice communication for a hierarchical process and an end response is transferred from the second processing device via the first processing device to the host device for releasing the interface connection, the system comprising:
   an elapsed-time detecting unit that detects an elapsed time from a time when the first processing device receives the process request from the host device until transmitting the process request to the second processing device through the interdevice communication; and
   an interdevice communication monitoring unit that calculates a variable timeout time by subtracting the elapsed time from a predetermined fixed timeout time for monitoring the interdevice communication between the first processing device and the second processing device, and monitors an elapsed time of the interdevice communication.

7. A communication-connection monitoring
   method for a RAID apparatus including a first processing device and a second processing device that perform a volume input/output process, wherein a process request received by the first processing device through an interface connection with a host device is transmitted to the second processing device through an interdevice communication for a hierarchical process and an end response is transferred from the second processing device via the first processing device to the host device for releasing the interface connection, the method comprising:
   an elapsed-time detecting step of detecting an elapsed time from a time when the first processing device receives the process request from the host device until transmitting the process request to the second processing device through the interdevice communication; and
   an interdevice communication monitoring step of calculating a variable timeout time by subtracting the elapsed time from a predetermined fixed timeout time for monitoring the interdevice communication between the first processing device and the second processing device, and monitoring an elapsed time of the interdevice communication.

8. The communication-connection monitoring method according to claim 7, wherein the fixed timeout time is a time shorter than a predetermined interface connection check time for monitoring an elapsed time of the interface connection between the host device and the first processing device.

9. The communication-connection monitoring method according to claim 7, wherein, in the interdevice communication monitoring step, when the elapsed time of the interdevice communication exceeds the variable timeout time, the host device is requested to separate the interface connection, and then when the end response is obtained from the second processing device, the host device is requested for an interface reconnection, and the end response is transmitted.

10. The communication-connection monitoring method according to claim 7, wherein
   in the elapsed-time detecting step, an elapsed time from a time when the first processing device receives the process request from the host device until transmitting a first process request to the second processing device through the interdevice communication to obtain an end response is detected, and
   in the interdevice communication monitoring step, a variable timeout time is calculated by subtracting the elapsed time from the fixed timeout time, and monitoring an elapsed time until a second process request is transmitted to the second processing device through an interdevice communication to obtain an end response is monitored.

11. The communication-connection monitoring method according to claim 10, wherein the process request to be transmitted by the first processing device to the second processing device through the interdevice communication is a process request for making process information associated with the input/output request redundant.

12. A communication-connection monitoring method of transmitting a process request received by a first processing device through an interface connection with a host device to a second processing device through an interdevice communication for a hierarchical process and transferring an end response from the second processing device via the first processing device to the host device for releasing the interface connection, the method comprising:

an elapsed-time detecting step of detecting an elapsed time from a time when the first processing device receives the process request from the host device until transmitting the process request to the second processing device through the interdevice communication; and an interdevice communication monitoring step of calculating a variable timeout time by subtracting the elapsed time from a predetermined fixed timeout time for monitoring the interdevice communication between the first processing device and the second processing device, and monitoring an elapsed time of the interdevice communication.

13. In a system where a process request received by a first processing device through an interface connection with a host device is transmitted to a second processing device through an interdevice communication for a hierarchical process and an end response is transferred from the second processing device via the first processing device to the host device for releasing the interface connection, a communication-connection monitoring method causing a computer of the first processing device provided in the system to execute steps comprising:

an elapsed-time detecting step of detecting an elapsed time from a time when the first processing device receives the process request from the host device until transmitting the process request to the second processing device through the interdevice communication; and an interdevice communication monitoring step of calculating a variable timeout time by subtracting the elapsed time from a predetermined fixed timeout time for monitoring the interdevice communication between the first processing device and the second processing device, and monitoring an elapsed time of the interdevice communication.

* * * * *

UNITED STATES PATENT AND TRADEMARK OFFICE
CERTIFICATE OF CORRECTION

PATENT NO.        : 7,567,514 B2                                    Page 1 of 1
APPLICATION NO.   : 11/229693
DATED             : July 28, 2009
INVENTOR(S)       : Akihito Kobayashi et al.

It is certified that error appears in the above-identified patent and that said Letters Patent is hereby corrected as shown below:

Column 15, Line 60, after "transmitted by" delete "the".

Signed and Sealed this

Thirteenth Day of October, 2009

David J. Kappos
*Director of the United States Patent and Trademark Office*